United States Patent
Cariou et al.

(10) Patent No.: US 9,712,223 B2
(45) Date of Patent: Jul. 18, 2017

(54) METHOD OF TRANSMITTING FRAMES, AND CORRESPONDING STATIONS AND COMPUTER PROGRAM

(71) Applicant: Orange, Paris (FR)

(72) Inventors: Laurent Cariou, Rennes (FR); Akl Charaf, Rennes (FR)

(73) Assignee: ORANGE, Paris (FR)

( * ) Notice: Subject to any disclaimer, the term of this patent is extended or adjusted under 35 U.S.C. 154(b) by 144 days.

(21) Appl. No.: 14/354,869

(22) PCT Filed: Oct. 29, 2012

(86) PCT No.: PCT/FR2012/052487
§ 371 (c)(1),
(2) Date: Apr. 28, 2014

(87) PCT Pub. No.: WO2013/061009
PCT Pub. Date: May 2, 2013

(65) Prior Publication Data
US 2014/0314035 A1    Oct. 23, 2014

(30) Foreign Application Priority Data
Oct. 28, 2011   (FR) ...................................... 11 59834

(51) Int. Cl.
*H04B 7/06*  (2006.01)
*H04B 7/04*  (2017.01)
(Continued)

(52) U.S. Cl.
CPC ......... *H04B 7/0621* (2013.01); *H04B 7/0417* (2013.01); *H04B 7/0452* (2013.01)

(58) Field of Classification Search
CPC .. H04B 7/0621; H04B 7/0417; H04B 7/0452; H04L 1/0027; H04W 52/42; H04W 74/004

See application file for complete search history.

(56) References Cited

U.S. PATENT DOCUMENTS

| 8,761,033 B2 * | 6/2014 | Abraham .............. H04W 52/42 370/252 |
| 2008/0130790 A1 | 6/2008 | Forenza et al. |

(Continued)

FOREIGN PATENT DOCUMENTS

WO    2010/1147816 A1    10/2010

OTHER PUBLICATIONS

International Search Report and Written Opinion dated Apr. 5, 2013 for corresponding International Patent Application No. PCT/FR2012/052487, filed on Oct. 29, 2012.
D. Gesbert, M. Kountouris, R.W. Heath, C.B. Chae, T. Sälzer, "Shifting the MIMO paradigm", IEEE Proc. Mag., Sep. 2007.
"VHT Control and Link Adaptation", doc.:IEEE 802.11-11/0040r0, slides 1-15, Jan. 18, 2011.

(Continued)

*Primary Examiner* — Walter Divito
(74) *Attorney, Agent, or Firm* — David D. Brush; Westman, Champlin & Koehler, P.A.

(57) ABSTRACT

A frame transmission method is provided for use in a multiuser MIMO system having a transmitter with a plurality of antennas and receivers that are respectively associated with users. The method includes: constructing a sounding frame in which a first portion has at least one symbol for synchronizing destination receivers and a second portion has at least as many pre-coded pilot symbols as there are destination receivers; transmitting the sounding frame in a broadcast mode for its first portion and in a directional mode for its second portion to each of the destination receivers; and constructing a respective data frame for sending to each of the destination receivers by taking account of feedback information coming from the destination receivers and, for each destination receiver, coding interference between destination receivers.

8 Claims, 3 Drawing Sheets

(51) Int. Cl.
H04B 7/0417 (2017.01)
H04B 7/0452 (2017.01)

(56) References Cited

U.S. PATENT DOCUMENTS

| | | |
|---|---|---|
| 2009/0323773 A1 | 12/2009 | Bala et al. |
| 2011/0134859 A1 | 6/2011 | Li et al. |
| 2011/0319122 A1* | 12/2011 | Zhou .................. H04W 52/146 455/522 |
| 2012/0177018 A1* | 7/2012 | Abraham .............. H04L 1/0027 370/338 |
| 2012/0320932 A1* | 12/2012 | Xu .......................... H04B 3/54 370/474 |
| 2013/0107916 A1* | 5/2013 | Liu ...................... H04B 7/0452 375/219 |
| 2016/0183257 A1* | 6/2016 | Vrzic .................. H04W 74/004 370/329 |

OTHER PUBLICATIONS

"Wireless LANs; Proposed TGac Draft Amendment", doc.: IEEE 802.11-10/1361r3, Jan. 18, 2011.
International Preliminary Report on Patentability and English translation of the Written Opinion dated Apr. 29, 2014 for corresponding International Patent Application No. PCT/FR2012/052487, filed on Oct. 29, 2012.
French Search Report and Written Opinion dated Jun. 28, 2012 for corresponding French Application No. 1159834, filed Oct. 28, 2011.

\* cited by examiner

METHOD OF TRANSMITTING FRAMES, AND CORRESPONDING STATIONS AND COMPUTER PROGRAM

CROSS-REFERENCE TO RELATED APPLICATIONS

This application is a Section 371 National Stage Application of International Application No. PCT/FR2012/052487, filed Oct. 29, 2012, which is incorporated by reference in its entirety and published as WO 2013/061009 on May 2, 2013, not in English.

FIELD OF THE INVENTION

The present invention relates to the field of telecommunications. Within this field, the invention relates more particularly to the field of digital communications by radio, also referred to as wireless communications, and including WiFi networks as standardized in the Institute of Electrical and Electronic Engineers (IEEE) standards 802.11 et seq., where it is necessary to have knowledge about the channel on transmission. Those standards guarantee interoperability between wireless communications devices that comply therewith.

More precisely, the invention relates to transmitting and receiving frames between WiFi devices that enable the transmitter to take account of the propagation channel on the basis of information returned in a feedback message coming from the receiver.

The term "device" is used herein to mean an appliance forming part of a basic service set (BSS) constituted by an access point and the stations associated with the access point, i.e. the stations situated in the coverage zone of the access point.

The invention is particularly applicable to multiuser multiple input and multiple output (MU-MIMO) type transmission systems that make use of space division multiple access (SDMA) together with beamforming. In the MU-MIMO field, the term "user" is often used to designate the station with which the user is associated.

PRIOR ART

Figure 1:
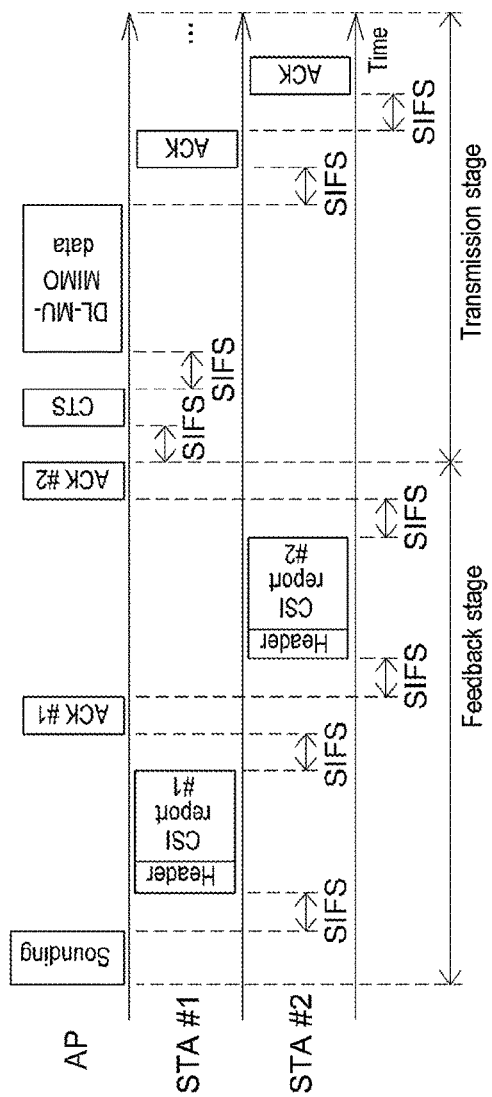

MU-MIMO transmission techniques requiring knowledge of the propagation channel on transmission involve two stages: a feedback stage F of recovering information about the channel without transmitting payload data, and a transmission stage T of transmitting payload data, as shown in FIG. 1 for an SDMA technique in a context having three devices. The example shown comprises a transmission stage made up of a base element, i.e. a payload data transmission packet encapsulated in a frame followed by acknowledgments of the reception of the payload data as transmitted by the users.

Figure 2:
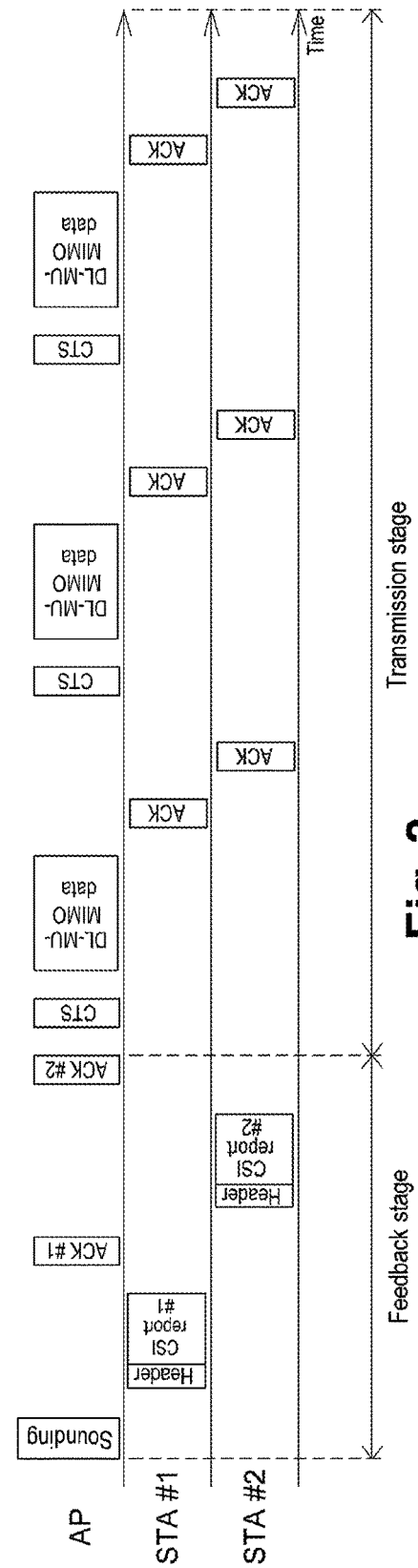

The transmission stage T may include a plurality of successive base elements so long as the channel does not vary. FIG. 2 shows a transmission stage having three base elements transmitted in succession.

During the feedback stage F, the transmitter, e.g. an access point AP, sends a packet comprising pilots, referred to as a "sounding" packet to the stations (STA#1, STA#2). These packets enable the stations to estimate information about the state of the downlink (DL) channel. Thereafter, these stations encode the channel estimate, written CSI_DL, and transmit it to the access point AP in a channel state information report "CSI report" frame. This mechanism, which makes an estimate of the channel available on transmission, is sometimes referred to as "explicit" feedback.

The variation over time of the channel determines the duration of the transmission stage. Thus, if the channel varies sufficiently during a period of F+nTe milliseconds (ms) for the SDMA technique to cease functioning, e.g. because of interference between users becoming too strong, then the duration of the transmission stage must be shorter than nTe ms. At the end of this transmission stage T, a new feedback stage F is performed, in order to obtain an up-to-date estimate of the transmission channel.

For example, the beamforming technique of the 802.11n standard that serves to focus transmission power towards a particular receiver and thereby to increase the signal-to-noise ratio on reception, makes use of a feedback stage once every 100 ms in a deployment context corresponding to an open space without the transmitters and/or receivers moving. This duration after which the feedback stage is performed is shortened to 25 ms in the same environment when using the multiuser SDMA technique.

It is found that the longer the duration of the stage T in which payload data is transmitted, the greater the overall transmission rate. Nevertheless, as mentioned above, the length of the transmission stage is limited by variations in the channel over time due to movements of the transmitter or of the receiver or due to modifications in the environment.

During the transmission stage, the access point AP transmits one or more payload data packets, written DL-MU-MIMO, to a plurality of users. Simultaneous transmission is conventionally performed by forming beams aimed respectively at different users by means of a data precoding technique that makes use of the response of the propagation channel of each user. The best known precoding technique is the so-called "zero forcing" (ZF) technique as set out in article [1]. ZF precoding consists in weighting user data with respective precoding vectors determined on the basis of the estimate of the channel for the purpose of canceling the interference caused by one user at the receivers of other users.

Nevertheless, performing those techniques does not always enable perfect cancellation to be achieved, in particular because of the adaptations that are needed during implementation. Thus, in order to reduce the signaling overload that results from explicit feedback, sometimes only the best modes constitute the subject matter of the feedback. After the channel has been estimated, the MIMO channel is decomposed into singular values and eigen vectors. For a 4×4 MIMO channel, there are four singular values and four corresponding eigen vectors. Each singular value and its associated eigen vector represents something called a "proper mode" of the channel over which a data stream can be transmitted. The proper modes are mutually orthogonal and therefore do not interfere with one another. In the best circumstances, it is thus possible to have four proper modes and to transmit four space-divided streams in parallel. However in general, certain proper modes have a singular value of zero, which means that it is not possible to transmit a stream over those modes. Under such circumstances, only the strongest modes constitute the subject matter of feedback since it is only those modes on which it is possible to transmit information. Under such circumstances, the access point obtained only partial information about the channel and consequently inter-user interference cannot be canceled completely.

In addition, under certain conditions that are said to be "mobile", i.e. when the devices are moving relative to one another, there may be a difference between the characteristics of the channel over which the feedback returns and the characteristics of the channel during the following transmission stage. This difference can lead to an increase of interference between users on reception.

Recent work developed in particular around the IEEE802.11ac standardization group, has set out to find techniques for reducing that interference.

Figure 3:
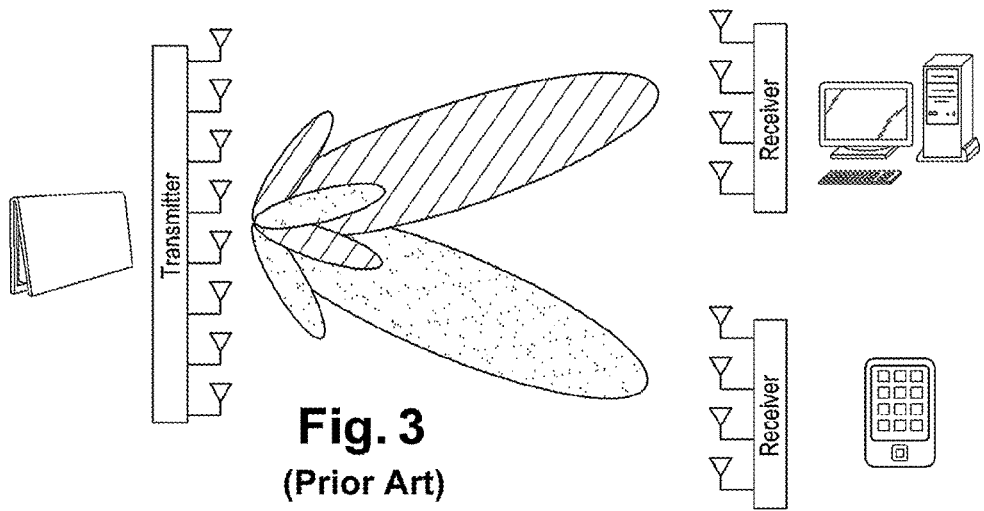

Thus, with the SDMA technique, for example, an access point AP possessing four antennas can transmit simultaneously over the same frequency band to four users, by forming respective beams pointing to each of the users in order to eliminate interference between users, as shown in FIG. 3. These beams are calculated on the basis of the channel information of each user.

Under ideal situations, each user receives only the information intended for that user, i.e. only one spatial stream from the four spatial streams sent by the access point.

In a first implementation, the access point sends to each user only the pilot symbols needed for estimating the channel associated with the spatial stream destined for that user. In that implementation, and with reference to FIG. 4, the access point transmits a sounding packet with omnidirectional transmission for the first fields L-STF, L-LTF, L-SIG, and VHTSIGA, and then using directional transmission for the following fields, i.e. using precoding, in particular for the VHT-LFTi fields containing the pilots. The sounding packet is encapsulated in a frame that compresses the first four fields (L-STF, L-LFT, L-SIG, VHTSIGA) and the following four fields (VHT-STF, VHT-LTF1, VHTSIGB, VHTData) after precoding and then addition.

Figure 5:
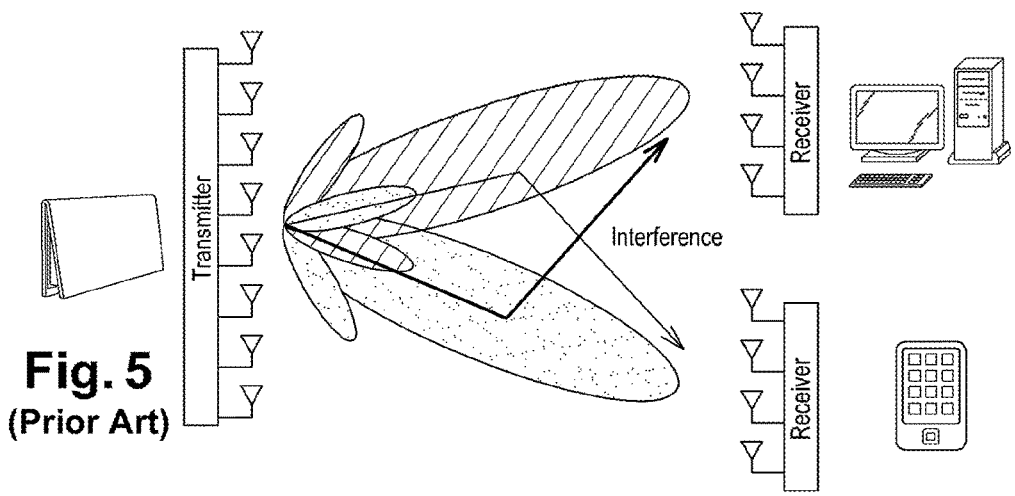

Nevertheless, in particular because of its variation over time, the real channel departs from the ideal situation and a user can receive the information intended for that user together with interference from information intended for the other users, as shown in FIG. 5. If a user possesses more receive antennas than there are spatial streams intended for that user, it is possible for the user to eliminate some or all of the interference by known interference canceling techniques (such as the minimum mean square error (MMSE) technique). Nevertheless, that is possible only if the user is capable of estimating the channel for the spatial streams for the other users.

Figure 6:

In a second implementation, the access point transmits to each user not only the pilot symbols enabling the user to estimate the channel for the spatial stream intended for that user, but also the pilot symbols enabling the user to estimate the channels for the spatial streams that are for the other users, as shown in FIG. 6, thus making it possible to eliminate some or all of the interference between users.

In this implementation, the access point transmits the pilot symbols intended for the various different users in succession. The pilot symbols for the various users are thus positioned at successive instants within packets bound respectively to the various users. Either the pilot symbols for one user are transmitted on their own, or else they are multiplexed with the pilot symbols for the other users but in such a manner that the links are mutually orthogonal, i.e. in such a manner that the links between the transmitter and the various users are orthogonal. Link orthogonality is obtained by precoding the pilots with the precoding vectors of the users.

On reception, each user estimates the channel followed by the direct signal and also the channels followed by the interference, by making use of the various pilot symbols. The estimates of the various channels are fed back to the access point by each user. Patent application WO 2010/117816 A1 gives a detailed description of one construction for SDMA precoding vectors based on feedback of the channel coefficients from the various stations.

That second implementation makes it possible to be more robust when faced with channel variations over time because it enables the interference that is generated to be canceled. However, it requires a larger number of pilot symbols to be transmitted to each user, thereby reducing the efficiency of the physical layer of the transmission system.

In any event, whatever the transmission technique, a new feedback stage needs to be performed as soon as the interference becomes too great.

SUMMARY OF THE INVENTION

The invention proposes improving known techniques for combating interference by providing a frame transmission method for performing by a multiuser MIMO system comprising a transmitter with a plurality of antennas and receivers associated with respective users.

Thus, the invention provides a frame transmission method for use in a multiuser MIMO system comprising a transmitter with a plurality of antennas and receivers that are respectively associated with users, the method being characterized in that it comprises:
  a step of constructing a sounding frame in which a first portion comprises at least one symbol for synchronizing destination receivers and a second portion comprises at least as many precoded pilot symbols as there are destination receivers;
  a step of transmitting the sounding frame in a broadcast mode for its first portion and in a directional mode for its second portion to each of the destination receivers; and
  a step of constructing a respective data frame for sending to each of the destination receivers;
  the data frame construction step taking account of feedback information coming from the destination receivers and, for each destination receiver, coding interference between destination receivers.

Thus, in the invention, the MU-MIMO transmissions are improved by enabling the transmitter to adapt its frame construction so as to diminish the impact of interference between users at the destination receivers.

Given its reception of sounding frames, a destination receiver uses conventional estimation techniques and the various precoded pilots to estimate its transmission channel and also the transmission channels followed by the interference signals corresponding to the precoded pilots that were precoded with the vectors of the other receivers.

On the basis of its knowledge about the transmission channels, the destination receiver calculates the power of the interference due to the symbols for the other destination receivers. By way of example, the calculation may be based on an average of the norm of the channel estimate over all of the subcarriers of the signals transmitted (typically using orthogonal frequency division modulation) and over all of the spatial streams.

Thus, a destination receiver that is subject to interference due to precoded symbols for other destination receivers, interference that may be referred to as inter-user interference or inter-receiver interference, has means for measuring the level of the interference and for determining which destination receivers are associated with the symbols that are interfering with the reception of symbols intended for the destination receiver in question.

The transmitter thus receives information from the various destination receivers about the inter-user interference to which each of the various destination receivers is subject. The transmitter can then construct the data frame using a distribution of data for the various destination receivers that takes account of the inter-user interference.

In an implementation, for a given destination receiver, the feedback information codes solely an identifier for that one of the interfering destination receivers that is generating the highest level of interference between destination receivers from among the various interferences between destination receivers received by the given destination receiver.

In this implementation, the destination receiver determines whether another destination receiver has a preponderant role in the interference to which it is subject. The destination receivers of a MU-MIMO transmission are part of a user group. This group possesses an identifier and each user in the group possesses a number that references the channel estimation codes and the MIMO streams used (spatial streams). During a MU-MIMO transmission, the header carries the group identifier information. A user can then determine from which other user the interference comes (i.e. can determine the number of this other user in the group). It can then signal that the interference comes from the user having the number x in the group x. The destination receiver can thus know the identifier of that other destination receiver and can code it in the feedback information. The transmitter then has the identifier of the destination receiver that is giving rise to the most interference in the reception of another destination receiver.

In an implementation of the invention, the data for first and second destination receivers is distributed in different data frames if the interference to which one of the destination receivers is subject and due to the other destination receiver exceeds a given threshold.

If the interference to which the destination receivers are subject that is due to another destination receiver exceeds a given threshold and/or exceeds the interference caused by the other destination receivers, then the transmitter can distribute the data for the two destination receivers in different data frames. These frames are typically transmitted successively in time. Thus, the first destination receiver is no longer disturbed by the symbols for the second destination receiver, and the level of interference is thus greatly reduced by eliminating the major source of interference.

In an implementation of the invention, interference between destination receivers that exceeds a given threshold triggers a step of transmitting a sounding frame.

Alternatively, the transmitter may trigger the transmission of a sounding frame. The interference levels as calculated by the destination receivers may take account of their knowledge of the transmission channels. If these transmission channels have varied since they were last estimated, the calculated interference levels may no longer be a correct reflection of reality. Thus, the sounding frame enables the destination receivers to update their knowledge about the transmission channel.

In an implementation of the invention, the feedback information is extracted from a data acknowledgment frame coming from a data destination receiver.

This implementation has the advantage of being compatible with numerous already-existing WiFi devices.

In an implementation of the invention, the feedback information is extracted from a field that uses the same bits to code a modulation mode and to code a destination receiver.

This implementation has the advantage of being compatible with the latest changes in the WiFi standards.

In an implementation of the invention, the precoded pilot symbols are distributed in succession in the second portion of the frame.

In this implementation, a destination receiver can easily estimate the transmission channel for the data that is intended for it, and the transmission channels for the data that is not intended for it.

The invention also provides a WiFi device having a plurality of antennas for a multiuser MIMO system comprising the device and receivers associated with respective users. A WiFi device of the invention comprises:

means for constructing a sounding frame in which a first portion comprises at least one symbol for synchronizing destination receivers, and a second portion comprising at least as many precoded pilot symbols as there are destination receivers;

means for constructing respective data frames for each of the destination receivers, the data frame construction means taking account of feedback information coming from the destination receivers and, for each destination receiver, coding interference between destination receivers; and transceiver means for transmitting and receiving frames via a transmission channel, these means being adapted to transmit the sounding frame in a broadcast mode for its first portion and in a directional mode for its second portion directed to destination receivers.

Such a WiFi device is adapted in particular to perform the above-described transmission method. By way of example, it may be a WiFi station or access point.

In a preferred implementation, the steps of the frame transmission method of the invention are determined by program instructions in the form of one or more modules incorporated respectively in electronic circuits such as chips which can themselves be arranged in an electronic device such as a WiFi access point or station. The frame transmission method of the invention can equally well be performed when the program (or its modules) is/are loaded in a calculator member such as a processor or the equivalent, with its operation then being controlled by executing the program.

Consequently, the invention also applies to a computer program (or its various modules), in particular a computer program on or in a data medium and adapted to perform the invention. The program may make use of any programming language, and it may be in the form of source code, object code, or code intermediate between source code and object code, such as in a partially compiled form or in any other desirable form for implementing a method of the invention.

The data medium may be any entity or device capable of storing the program. For example, the medium may comprise storage means such as a read-only memory (ROM), e.g. a compact disk (CD) ROM, or a microelectronic circuit ROM, or indeed the medium may comprise magnetic recording means, e.g. a hard disk, or it may comprise a universal serial bus (USB) key.

Alternatively, the data medium may be an integrated circuit in which the program is incorporated, the circuit being adapted to execute or to be used in the execution of the method in question.

Furthermore, the program may be converted into a transmissible form such as an electrical or optical signal that can be conveyed via an electrical or optical cable, by radio, or by other means. The program of the invention may in particular be downloaded from a network of the Internet type.

Thus, the invention also provides a computer program including program instructions adapted to performing a frame transmission method in accordance with the invention performed by a WiFi device for a multiuser MIMO system comprising the device and receivers associated with respective users, when said program is loaded in and executed by the WiFi device for performing the transmission method.

The invention also provides a data medium including program instructions adapted to performing a frame transmission method in accordance with the invention performed by a WiFi device for a multiuser MIMO system comprising the device and receivers associated with respective users, when said program is loaded in and executed by the WiFi device for performing the transmission method.

LIST OF FIGURES

Figure 4:
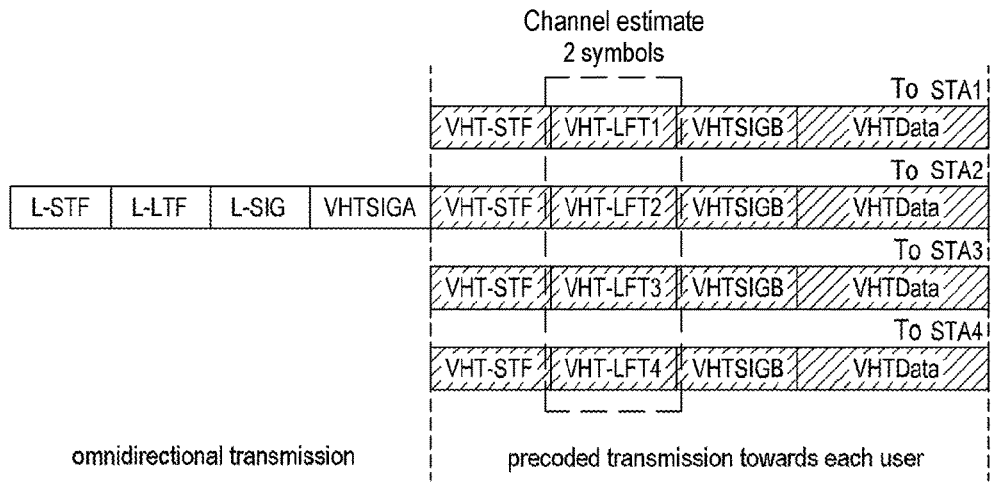
Figure 8:
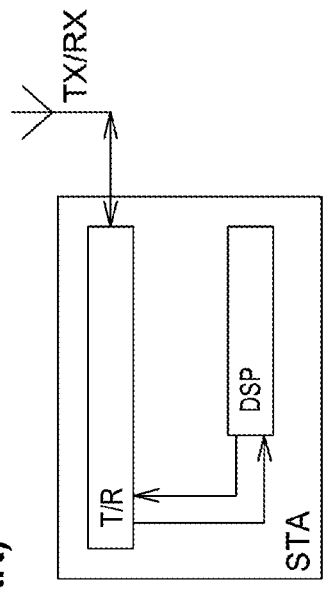
Figure 7:
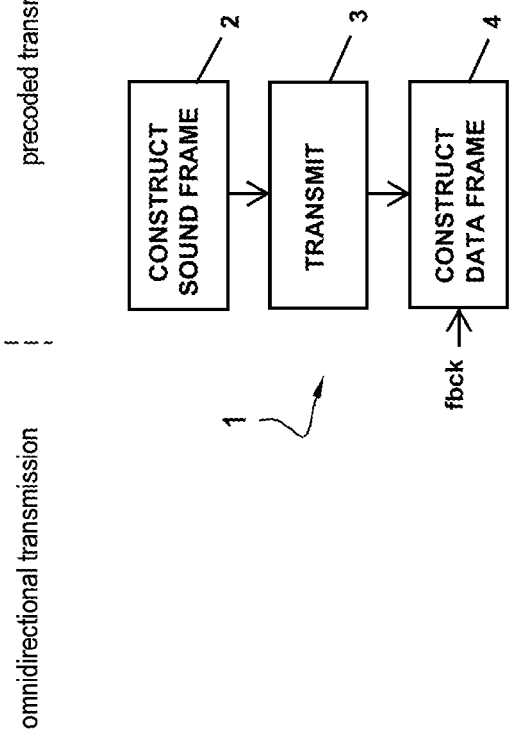

Other characteristics and advantages of the invention appear more clearly on reading the following description of particular embodiments, given merely as illustrative and non-limiting examples, and with reference to the accompanying drawings, in which:

FIG. 1, mentioned with reference to the prior art, is a diagram illustrating the feedback stage F of recovering information about the channel without transmitting payload data, and the payload data transmission stage T, for an SDMA transmission technique in a three-device context;

FIG. 2, mentioned with reference to the prior art, is a diagram showing a stage F of recovering information about the channel followed by a transmission stage having three base elements transmitted in succession, for an SDMA transmission technique in a three-device context;

FIG. 3, mentioned with reference to the prior art in an SDMA transmission context, is a diagram showing an access point AP that possesses four antennas and that transmits simultaneously over the same frequency band to four users by forming respective beams aimed at each user in order to eliminate inter-user interference;

FIG. 4, mentioned with reference to the prior art in an SDMA transmission context, is a diagram showing a first implementation of a transmission method in which the access point transmits a sounding frame using omnidirectional transmission for the first fields L-STF, L-LTF, L-SIG, and VHTSIGA, followed by directional transmission for the following fields containing the pilots, and in particular the VHT-LTFi field;

FIG. 5, mentioned with reference to the prior art in a context identical to that of FIG. 3, is a diagram showing the interference suffered by a destination receiver/user as a result of the information for the other destination receiver/users;

FIG. 6, mentioned with reference to the prior art in an SDMA transmission context, is a diagram showing a second implementation of a transmission method in which the access point transmits a sounding frame using omnidirectional transmission for the first fields L-STF, L-LTF, L-SIG, and VHTSIGA, and then using directional transmission for the following fields containing the pilots, and in particular the VHT-LTFi field;

FIG. 7 is a flow chart showing the main steps of the transmission method of the invention; and FIG. 8 is a diagram of a simplified structure example for a station suitable for transmitting data packets in accordance with the invention.

DESCRIPTION OF AN IMPLEMENTATION OF THE INVENTION

The invention is described in the context of the IEEE 802.11ac standard as described in particular in document IEEE802.11-11/0040r0. According to that document, a "MAC VHT control field" frame serves to feed back information, in particular for link adaptation.

| B0 | B1 | B2 | B3-B5 | B6-B8 | B9-B11 | B12-B15 | B16-B23 |
|---|---|---|---|---|---|---|---|
| HT/VHT | Solicited/ unsolicited | MRQ | MSI | MFSI/ GID-L | Nsts | MCS | SNR |

| B24-B26 | B27 | B28 | B29 | B30 | B31 |
|---|---|---|---|---|---|
| GID-H | Coding type | FB TX type | Reserved | AC constraint | RDG/more PPDU |

The field MFB enables link adaptation to be performed in MU-MIMO mode. In this mode, the station may make a proposal to the transmitter for it to adapt its transmission (data rate, . . . ) given its knowledge of the propagation channel, the performance of its receiver, and previous transmissions. The field Nsts defines the number of spatial streams that the station is requesting from the transmitter/access point. The field MCS defines the modulation and the efficiency of the code requested by the station from the transmitter/access point. The field SNR defines the signal-to-noise ratio estimated at the receiver.

This "VHT control field" frame may be included in various different transmissions, and in particular in acknowledgment frames.

The example described relates to a system of the kind shown in FIG. 5. The MU-MIMO system has an access point with a plurality of antennas and a plurality of receivers/users. The method 1 takes place as shown by the flow chart of FIG. 7. The method comprises:

a step 2 of constructing a sounding frame in which a first portion comprises at least one symbol for synchronizing destination receivers and a second portion comprises at least as many precoded pilot symbols as there are destination receivers;
  a step 3 of transmitting the sounding frame in a broadcast mode for its first portion and in a directional mode for its second portion to each of the destination receivers; and
  a step 4 of constructing a respective data frame for sending to each of the destination receivers.

Data frame construction step 4 takes account of feedback information fbck coming from the destination receivers and, for each destination receiver, coding its interference between destination receivers. Typically, the coded interference makes it possible to identify that one of interfering destination receivers that is generating the highest level of interference. The coded interference may code the interference levels to which the destination receiver is subject.

In a first implementation, the identifier of the interfering destination receiver is included in a new field "Interf" indicating that poor detection by the destination receiver is due to an interfering destination user/receiver (Interf=1). The Interf bit is set to "0" if reception is good or in the event of reception being poor but not because of interference due to another destination receiver. Another new field "interfering user index" serves to identify the destination user causing the interference. Given that groups of users can have a maximum of four users and that the ordering of these users in the group is known, two bits suffice to identify a user. For example, 00: user 1, 01: user 2, . . . . The composition of the "VHT control field" frame is then as follows:

| B0 | B1 | B2 | B3-B5 | B6-B8 | B9-B11 | B12-B15 | B16-B23 |
|---|---|---|---|---|---|---|---|
| HT/VHT | Solicited/ unsolicited | MRQ | MSI | MFSI/GID-L | Nsts | MCS | SNR |

| B24-B26 | B27 | B28 | B29 | B30 | B31 | B32 | B33-B34 |
|---|---|---|---|---|---|---|---|
| GID-H | Coding type | FB TX type | Reserved | AC constraint | RDG/ more PPDU | Interf | interfering user index |

In a second implementation, no field is added to the "VHT control field" frame for information feedback. The field MCS has four bits, thus making sixteen combinations possible. Only ten combinations are identified in the IEEE 802.11ac standard as described in document 1361r3. Four combinations are thus available. These four combinations enable the interfering destination receiver to be coded in the same manner as in the first implementation.

This second implementation does not require the "Interf" bit to be fed back since the use of any one of those four combinations implicitly contains the information that reception by the destination receiver is strongly disturbed by inter-user interference.

FIG. 8 is a diagram of a simplified structure example for a station suitable for transmitting frames in accordance with the invention.

The station is intended in particular for a multiuser MIMO system having a transmitter with a plurality of antennas TX/RX and receivers associated with respective users. The station acts as the transmitter and can also have the function of a WiFi access point giving access to a telecommunications network.

The station STA comprises:
means for constructing a sounding frame in which a first portion comprises at least one symbol for synchronizing destination receivers, and a second portion comprising at least as many precoded pilot symbols as there are destination receivers. These means typically comprise digital signal processor (DSP) calculation means, e.g. a microprocessor or a DSP, that are microprogrammed for calculating the pilot symbols precoded with the respective precoding vectors of the destination receivers;
means for constructing respective data frames for each of the destination receivers, the data frame construction means taking account of feedback information coming from the destination receivers and, for each destination receiver, coding interference between destination receivers together with an identifier of the interfering destination receiver. In the embodiment shown, these means are the same as the means for constructing the sounding frame, however the microprogramming of the DSP includes modules adapted respectively for constructing the sounding frame and for constructing the data frame; and
transceiver means T/R for transmitting and receiving frames via the transmission channel. These means comprise a conventional transceiver system adapted to transmit the sounding frame in a broadcast mode for its first portion and in a directional mode for its second portion directed to destination receivers. These transceiver means T/R are connected to the sounding frame construction means and to the data frame construction means.

Although the present disclosure has been described with reference to one or more examples, workers skilled in the art will recognize that changes may be made in form and detail without departing from the scope of the disclosure and/or the appended claims.

[1] D. Gesbert, M. Kountouris, R. W. Heath, C. B. Chae, T. Sälzer, "Shifting the MIMO paradigm", IEEE Proc. Mag., September 2007.

The invention claimed is:

1. A frame transmission method for use in a multiuser, multiple input and multiple output (MIMO) WiFi system comprising a transmitter with a plurality of antennas and receivers that are respectively associated with users, the method comprising:
constructing a sounding frame in which a first portion comprises at least one symbol for synchronizing destination receivers and a second portion comprises at least as many precoded pilot symbols as there are destination receivers;
transmitting the sounding frame in a broadcast mode for its first portion and in a directional mode for its second portion to each of the destination receivers, within the MIMO WiFi system; and
constructing a respective data frame for sending to each of the destination receivers, which takes account feedback information coming from the destination receivers and, for each destination receiver, interference between destination receivers, and wherein, for a given destination receiver, the feedback information codes solely an identifier for that one of the interfering destination receivers that is generating the highest level of interference between destination receivers from among the various interferences between destination receivers received by the given destination receiver.

2. The frame transmission method according to claim 1, wherein the data for first and second destination receivers is distributed in different data frames if the interference to which one of the destination receivers is subject and due to the other destination receiver exceeds a given threshold.

3. The frame transmission method according to claim 1, wherein interference between destination receivers that exceeds a given threshold triggers an act of transmitting a sounding frame.

4. The frame transmission method according to claim 1, wherein the feedback information is extracted from a data acknowledgment frame coming from a data destination receiver.

5. The frame transmission method according to claim 4, wherein the feedback information is extracted from a field that uses the same bits to code a modulation mode and to code a destination receiver.

6. The frame transmission method according to claim 1, wherein the precoded pilot symbols are distributed in succession in the second portion of the frame.

7. A WiFi device comprising:
a plurality of antennas for a multiuser, multiple input and multiple output (MIMO) Wifi system comprising the device and receivers associated with respective users;
means for constructing a sounding frame in which a first portion comprises at least one symbol for synchronizing destination receivers, and a second portion comprising at least as many precoded pilot symbols as there are destination receivers;
means for constructing respective data frames for each of the destination receivers, the data frame construction means taking account of feedback information coming from the destination receivers and, for each destination receiver, interference between destination receivers, and wherein, for a given destination receiver, the feedback information codes solely an identifier for that one of the interfering destination receivers that is generating the highest level of interference between destination receivers from among the various interferences between destination receivers received by the given destination receiver; and
a transceiver configured for transmitting and receiving frames via a transmission channel within the MIMO WiFi system, the transceiver being adapted to transmit the sounding frame in a broadcast mode for its first portion and in a directional mode for its second portion directed to destination receivers.

8. A non-transitory data medium including program instructions stored thereon and adapted to perform a frame transmission method performed by a WiFi device for a multiuser, multiple input and multiple output (MIMO) Wifi system comprising the device and receivers associated with respective users, when said program is loaded in and executed by the WiFi device for performing the transmission method, wherein the method comprises:
the Wifi device constructing a sounding frame in which a first portion comprises at least one symbol for synchronizing destination receivers and a second portion comprises at least as many precoded pilot symbols as there are destination receivers;
the Wifi device transmitting the sounding frame in a broadcast mode for its first portion and in a directional mode for its second portion to each of the destination receivers, within the MIMO WiFi system; and
the WiFi device constructing a respective data frame for sending to each of the destination receivers by taking account of feedback information coming from the destination receivers and, for each destination receiver, interference between destination receivers, and wherein, for a given destination receiver, the feedback information codes solely an identifier for that one of the interfering destination receivers that is generating the highest level of interference between destination receivers from among the various interferences between destination receivers received by the given destination receiver.

* * * * *